US012624171B2

(12) United States Patent
Nejad et al.

(10) Patent No.: US 12,624,171 B2
(45) Date of Patent: May 12, 2026

(54) LIGNIN-BASED PHENOLIC ADHESIVES, RELATED COMPOSITIONS, AND RELATED METHODS

(71) Applicant: BOARD OF TRUSTEES OF MICHIGAN STATE UNIVERSITY, East Lansing, MI (US)

(72) Inventors: Mojgan Nejad, Okemos, MI (US); Sasha Bell, Brooklyn, NY (US); Mohsen Siahkamari, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 0 days.

(21) Appl. No.: 17/793,093

(22) PCT Filed: Jan. 22, 2021

(86) PCT No.: PCT/US2021/014568
§ 371 (c)(1),
(2) Date: Jul. 15, 2022

(87) PCT Pub. No.: WO2021/150864
PCT Pub. Date: Jul. 29, 2021

(65) Prior Publication Data
US 2023/0056241 A1 Feb. 23, 2023

Related U.S. Application Data

(60) Provisional application No. 62/964,897, filed on Jan. 23, 2020.

(51) Int. Cl.
*C08H 7/00* (2011.01)
*C08G 8/04* (2006.01)
*C09J 197/00* (2006.01)

(52) U.S. Cl.
CPC ................. *C08H 6/00* (2013.01); *C08G 8/04* (2013.01); *C09J 197/005* (2013.01)

(58) Field of Classification Search
CPC ...................................... C08H 6/00; C08G 8/04
See application file for complete search history.

(56) References Cited

U.S. PATENT DOCUMENTS 4,403,066 A * 9/1983 Brode ...................... C08G 8/04
525/429
4,656,239 A * 4/1987 Waitkus ................... C08G 8/08
528/145

2013/0116383 A1 * 5/2013 Naskar ..................... C08J 3/243
525/132
2014/0249271 A1 * 9/2014 Pietarinen ............. C08L 97/005
530/500
2016/0215143 A1 * 7/2016 Gotou .................... C08L 97/005
2016/0229880 A1 8/2016 Pietarinen et al.
2016/0376434 A1 * 12/2016 Valkonen ................. C08G 8/24
524/735
2019/0194510 A1 6/2019 Pizzi et al.
2019/0233570 A1 * 8/2019 Maiorana .............. C08L 97/005
2022/0089805 A1 * 3/2022 Adriano Saraiva ...... C08H 6/00

FOREIGN PATENT DOCUMENTS

CN 107286905 A 10/2017
WO WO-2019/241607 A1 12/2019

OTHER PUBLICATIONS

International Application No. PCT/US2021/014568, International Search Report and Written Opinion, mailed Apr. 6, 2021.
Kalami S. et al., "Replacing 100% of phenol in phenolic adhesive formulations with lignin," *Journal of Applied Polymer Science*, 45124 (2017).
Kalami S. et al., "Comparative analysis of different lignins as phenol replacement in phenolic adhesive formulations," *Industrial Crops and Products*, 125:520-528 (2018).
Kalami S., "Development of biobased phenolic adhesives for engineered wood product," PhD dissertation, Mississippi State University, Aug. 2018.
Ammar et al., Fiberboards based on filled lignin resin and petiole fibers, J. Indian Acad. Wood Sci., 15(2):120-5 (Dec. 2018).
El Mansouri et al., Lignin-based wood panel adhesives without formaldehyde, Holz. Roh. Werkst., 65:65-70 (2007).
European Patent Application No. 21743805.0, Extended European Search Report, mailed Jan. 3, 2024.

* cited by examiner

*Primary Examiner* — Liam J Heincer
(74) *Attorney, Agent, or Firm* — MARSHALL, GERSTEIN & BORUN LLP

(57) ABSTRACT

The disclosure relates to adhesive compositions, including non-crosslinked resins and crosslinked/cured adhesives joining substrates, as well as related methods for making the compositions and articles. Compared to a conventional phenol (P) and formaldehyde (F) resin, the disclosed methods and compositions use lignin (L) and higher aldehydes (A) as corresponding replacements to provide an analog to a conventional PF resin with biobased reactants. Due to the differing reactivity of the LA components compared to the PF components, the initial condensation reaction between ortho-reactive sites in the lignin and the aldehyde is controlled to prevent gelation of the aqueous reaction mixture while reacting substantially all of the LA reactants to provide a non-crosslinked resin reaction product. The resin reaction product can then be cured at high temperature/high pressure conditions to provide a crosslinked adhesive, for example joining two substrates.

24 Claims, 2 Drawing Sheets

Glyoxal        Glutaraldehyde        Gossypol

LIGNIN-BASED PHENOLIC ADHESIVES, RELATED COMPOSITIONS, AND RELATED METHODS

CROSS REFERENCE TO RELATED APPLICATION

This application is a U.S. National Stage of PCT/US21/14568, filed Jan. 22, 2021, which claims priority to U.S. Provisional Application No. 62/964,897 (filed Jan. 23, 2020), both of which are incorporated herein by reference in their entireties.

STATEMENT OF GOVERNMENT INTEREST

This invention was made with government support under 2018-67009-27900 awarded by the U.S. Department of Agriculture. The government has certain rights in the invention.

BACKGROUND OF THE DISCLOSURE

Field of the Disclosure

The disclosure relates to adhesive compositions and related methods for making the compositions and articles. The disclosed methods and compositions use lignin (L) and higher aldehydes (A) to provide an analog to a conventional phenol-formaldehyde (PF) resin with biobased reactants. The condensation reaction between ortho-reactive sites in the lignin and the aldehyde is controlled to prevent gelation of the aqueous reaction mixture while reacting substantially all of the LA reactants to provide a non-crosslinked resin reaction product. The resin reaction product can then be cured to provide a crosslinked adhesive.

Brief Description of Related Technology

Phenol formaldehyde (PF) is the most commonly used adhesive in the production of construction wood products like plywood, oriented strand board (OSB), laminated veneer lumber (LVL) and other engineered wood products. Accounting for more than 54% of worldwide consumption, North America is the largest market for PF resin in wood adhesive applications. Phenol formaldehyde resin is currently produced through condensation polymerization of fossil-derived compounds, specifically formaldehyde (made from methanol) and phenol (produced from benzene using the cumene process). Depending on the ratio of formaldehyde to phenol in the mixture and the type of catalyst used (basic or acidic), the final resin is either Resol or Novolac. Resol is the most commonly used phenolic resin in wood products today, and is produced from formaldehyde to phenol ratio of approximately 1.5:1.0 (or about 2.0-1.1 (formaldehyde):1.0 (phenol)) in the presence of an alkaline catalyst (NaOH or a caustic/ammonia combination). The corresponding thermosetting resin (Resol) forms a 3D network in a one step process and, when cured at about 120° C. to 175° C. for 3 to 5 minutes, depending on the type of adhesive and thickness of the resin wood layers (e.g., 3-, 5-, or 7-ply plywood), provides excellent water and chemical resistance to wood products, as well as high mechanical performance.

Different lignin types have been evaluated as phenol substitutes in the production of phenolic resin to be used in engineered wood products. Exterior grade plywood, oriented strand board (OSB), and laminated veneer lumber (LVL) are typically made using phenolic resin which is competitively priced and imparts excellent moisture as well as chemical resistance. Lignin is a naturally occurring polyphenolic compound that has the potential to be used as a phenol replacement in the production of phenolic resin. New extraction processes and the availability of lignin in large quantities from different resources including wood and annual crops provide a variety of different lignin types, particularly from agricultural sources.

Kalami et al. *J. Appl. Polymer Sci., vol.* 134, pp. 45124-45132 (2017) (Kalami 2017), and Kalami et al. *Ind. Crops & Products.*, vol. 125, pp. 520-528 (2018) (Kalami 2018) are directed to adhesive compositions formed from lignin (L) and formaldehyde (F). Lignins from different sources (softwood, hardwood, or annual crop) and different isolation methods (kraft, organosolv, sulfite, soda, or enzymatic hydrolysis) were used as a phenol replacement in phenolic adhesive formulations.

Despite the high performance of formaldehyde-based resins, there are major concerns regarding exposure to phenol and formaldehyde during the manufacturing process and free formaldehyde from corresponding wood to a lesser extent. Although the cured phenolic resin does not emit formaldehyde like urea-formaldehyde resins do, chronic exposure to formaldehyde during the manufacturing process of the resin is a health concern. According to a formaldehyde risk assessment study by the EPA (1991), this is generally due to potential reactions of formaldehyde with proteins, which can cause skin irritation, and inflammation of eye membranes, nose and throat.

SUMMARY

In one aspect, the disclosure relates to a method for forming an adhesive composition, the method comprising: providing an aqueous reaction mixture comprising water, a lignin comprising aromatic hydroxyl groups and ortho-reactive carbon atoms relative to the hydroxyl groups, and an aldehyde having at least 2 carbon atoms and having at least 1 aldehyde functional group (—CHO); adding a base catalyst in a controlled manner to the aqueous reaction mixture, thereby catalyzing a condensation reaction between the lignin and the aldehyde while maintaining a viscosity of aqueous reaction mixture below a gelation point of the aqueous reaction mixture; and continuing the condensation reaction between the lignin and the aldehyde to form a resin reaction product while maintaining the viscosity of aqueous reaction mixture below the gelation point of the aqueous reaction mixture until a completion point is reached, wherein, at the completion point, at least some unreacted ortho-reactive carbon atoms remain, and at least some substituted methylol functional groups have been formed by the condensation reaction and are present in the resin reaction product.

Suitably, the resin reaction product is not crosslinked at the completion point. Thus, while aldehyde groups and ortho-reactive carbon atoms have reacted to form (substituted) methylol, alkylol, or hydroxyglyoxylated groups at the ortho sites of the aromatic hydroxyl groups in the lignin, a networked or crosslinked thermoset polymer with (substituted) methylene, alkylene, glyoxylene, etc. groups bridging or linking ortho sites of two lignin aromatic groups has not yet formed. An aldehyde reactant can be generically represented by R—CHO, where R can include one or more aldehyde groups itself for the di- or higher aldehydes according to the disclosure (e.g., R is CHO for glyoxal), R can be an alkyl group for a monoaldehyde (e.g., R is $CH_3$ for acetaldehyde), and R is H for formaldehyde (e.g., as a possible co-reactant). The (substituted) methylol groups present at the completion point and linked to the ortho sites are correspondingly represented by —CHR—OH. Aldehyde groups in R could remain as aldehyde groups at this point, and/or aldehyde groups in R could also react with other ortho sites to form additional substituted methylol groups. The (substituted) methylene groups present after curing/crosslinking (and preferably absent at the completion point) and linking two ortho sites are correspondingly represented by —CHR—. Aldehyde groups originally in R could have been converted to additional substituted methylene groups, and/or could have reacted with functional groups on a (wood) substrate or filler during curing. A reaction product that has passed the completion point and begun to crosslink is generally insoluble in the aqueous reaction medium and can be identified by solids (e.g., precipitate) in the reaction medium. Accordingly, the aqueous reaction medium is suitably substantially free from solid or precipitate material at the completion point (e.g., less than 0.1 or 0.01 wt. % solids not dissolved or otherwise in solution).

Adding the catalyst in a controlled manner can generally include selecting a catalyst concentration, adding the catalyst batchwise (e.g., in 2, 3, 4, or more batch additions) or continuously over time, etc. in a manner that promotes the rate of the condensation reaction, but which prevents the condensation reaction from proceeding too rapidly in a manner that would cause gelation via excessive crosslinking during resin formation. This promotes reaction and higher conversion of a larger proportion of the lignin and aldehyde reactants. Without control of the reaction rate, it is possible for a relatively smaller fraction of the lignin and aldehyde reactants to rapidly react, crosslink, and gel, which in turn prevents further reaction of other ortho-reactive carbon atoms and unreacted aldehyde groups in the reactants (e.g., monomers, short oligomers, etc.). This results in low overall reactant conversion and/or a reaction product that is not suitable for use as an adhesive.

The condensation reaction can proceed both during and after catalyst addition, and the condensation reaction is controlled to avoid gelation during both phases. The completion point reflects a point during the reaction at which a substantial amount of the aldehyde groups and ortho-reactive carbon atoms have reacted to form (substituted) methylol groups and/or extended chains with aldehyde or hydroxyl end-groups at the ortho sites of the aromatic hydroxyl groups in the lignin, but there has not been any substantial crosslinking. At least some ortho-reactive carbon atoms remain at the completion point and are available for further reaction during curing. For example, the (substituted) methylol groups can react during curing with other ortho-reactive carbon atoms to form the (substituted) methylene groups linking adjacent aromatic groups. Any remaining aldehyde groups can react during curing with a substrate functional group (e.g., the lignocellulosic group in a wood substrate), a filler functional group (e.g., for a lignocellulosic or polysaccharide filler), and/or other ortho-reactive carbon atoms in lignin moieties. The completion point can represent a point at which the (condensation) reaction is terminated/halted, for example, by freezing or otherwise cooling the aqueous reaction mixture containing the partially reacted resin, such as for storage until subsequent use as a resin to form an adhesive. The completion point also can represent a point at which other adhesive/glue formulation components are added to the aqueous reaction mixture containing the partially reacted resin for further curing and adhesive formation.

Various refinements of the disclosed methods, resin compositions and adhesive compositions are possible.

In a refinement, the method comprises forming the resin reaction product at a reaction temperature in a range from 40° C. to 95° C. or 65° C. to 85° C. while avoiding gelation and crosslinking. The reaction temperature for the initial condensation reaction to form the resin reaction product is not particularly limited, for example being at least 40, 50, 60 or 65° C. and/or up to 70, 80, 85, 90, or 95° C. The reaction pressure is suitably atmospheric pressure, for example, 0.8 to 1.2 bar or 0.9 to 1.1 bar. The reaction time can be selected as desired and in view of the temperature and pressure conditions, but it typically can range from about 1-2 hr or 1-4 hr for common reaction conditions. Suitably, the reaction conditions are controlled such that substantially all of the initial aldehyde reactant or reactants have reacted to form at least one corresponding substituted methylol group at an ortho-reactive site, but it is possible that at least some pendant (unreacted) aldehyde groups remain. For example, a glyoxal molecule having reacted with one ortho-reactive carbon will form one substituted methylol group and retain one unreacted aldehyde group. Similarly, a glyoxal molecule having reacted with two ortho-reactive carbons will form two substituted methylol groups and have no remaining unreacted aldehyde groups. For example, at the completion point, at least 90, 95, 98, 99, or 99.9% of the initial aldehyde (e.g., on a weight or molar basis) has reacted to form at least one corresponding substituted methylol group, in particular while avoiding crosslinking.

In a refinement, the lignin is derived from a biomass selected from the group consisting of hardwoods, softwoods, grasses (e.g., agricultural residues), and combinations thereof.

In a refinement, the lignin is isolated from an extraction process selected from the group consisting of Kraft extraction, soda extraction, organosolv extraction, enzymatic hydrolysis extraction, ionic liquid, extraction, sulfite extraction, and combinations thereof. In various embodiments, the lignin, prior to reaction and/or incorporation into the aqueous reaction mixture, suitably has some or all of the following properties: a molecular weight in a range of 500 to 50000, 500 to 20000, or 3000 to 5000; a polydispersity in a range of 1.2 to 10, 1.2 to 5, or 2 to 4; an aliphatic hydroxyl content in a range of 1 to 5 mmol/g, 1 to 4 mmol/g, or 1 to 3 mmol/g; a phenol hydroxyl content in a range of 1 to 6 mmol/g, 2 to 6 mmol/g, or 3 to 6 mmol/g; and a total hydroxyl content in a range of 3 to 9 mmol/g or 4 to 7 mmol/g.

In a refinement, the lignin (e.g., as initially added to the aqueous reaction mixture prior to condensation reaction) has at least one of the following properties: a weight-average molecular weight of 2000 or less; a weight-average molecular weight of 1200 or more; a polydispersity of 2.0 or less; a polydispersity of 1.5 or more; and at least 50% or at least 60% of the aromatic hydroxy groups have at least 1 ortho-reactive carbon relative to the hydroxy group (e.g., 1 or 2 ortho-reactive carbons).

Lower molecular weights and low polydispersities are desirable to promote access to and reactivity of the aromatic hydroxy groups of the lignin, but lignin with any molecular weight and/or polydispersity can be used. Suitably, the weight-average molecular weight ($M_w$) is at least 500 or 800 and/or up to 1000, 1200, 1500, 2000, or 5000, but higher values are possible. Similarly, the polydispersity ($M_w/M_n$, where $M_n$ is the number-average molecular weight) is at least 1.2 or 1.4 and/or up to 1.5, 1.8, 2.0, 3.0, or 4.0, but higher values are possible.

Aromatic hydroxy groups with available ortho-reactive carbon atoms adjacent to the hydroxy group on the lignin phenolic residue are suitable for the condensation reaction with the aldehyde groups. The carbon atoms in the phenolic ring and adjacent to the hydroxy group are particularly suitable for condensation reaction with aldehydes when they contain a hydrogen atom attached to the ring (e.g., instead of a methoxy or other alkoxy or blocking group). A lignin phenolic residue with two ortho-reactive carbon atoms generally corresponds to a hydroxyphenyl residue, a lignin phenolic residue with one ortho-reactive carbon atom generally corresponds to a guaiacyl residue, and a lignin phenolic residue with zero ortho-reactive carbon atoms generally corresponds to a syringyl residue. Suitably, at least 60, 70, 80, 85, 90, or 95% and/or up to 90, 95, 98, or 100% of the aromatic hydroxy groups have 1 or 2 ortho-reactive carbon atoms. Alternatively or additionally, at least 10, 20, 30, 40, 50, 60, 70, or 80% and/or up to 40, 60, 80, 90, or 100% of the aromatic hydroxy groups have 1 ortho-reactive carbon atom. Alternatively or additionally, at least 10, 20, 30, 40, 50, 60, 70, or 80% and/or up to 40, 60, 80, 90, or 100% of the aromatic hydroxy groups have 2 ortho-reactive carbon atoms. The relative distribution of hydroxyphenyl, guaiacyl, and syringyl residues in a lignin sample can be controlled or selected according to the method used to extract the lignin from a biomass sample. The total aromatic hydroxy content (or phenolic hydroxyl content) of the lignin suitable is in a range of 2 to 5 mmol/g.

In a refinement, the aldehyde has 2 to 50 carbon atoms and has 1 to 4 or 2 to 4 aldehyde functional groups. Suitably, the aldehyde has at least 2, 4, 6, 8, or 10 carbon atoms and/or up to 4, 6, 8, 10, 20, 30, 50, or more carbon atoms. Alternatively or additionally, the aldehyde can have 1, 2, 3, 4, or more aldehyde groups. Examples of suitable aldehydes include glyoxal ($C_2$ dialdehyde), glutaraldehyde ($C_5$ dialdehyde), gossypol ($C_{30}$ polyaromatic dialdehyde), oxidized starch (polymeric polyaldehyde), etc. In some embodiments, formaldehyde can be included in the aqueous reaction mixture along with the at least di-functional aldehyde according to the disclosure.

In a refinement, the aqueous reaction mixture (e.g., as originally provided) is free from phenol and/or formaldehyde. The resin and adhesive according to the disclosure preferably uses complete replacement of phenol (P) and/or formaldehyde (F) with lignin (L) and/or higher aldehydes (A), respectively, to provide an analog to a conventional PF resin with biobased reactants. Suitably, the aqueous reaction mixture contains less than 10, 5, 2, 1, or 0.1 wt. % of phenol and/or formaldehyde, whether individually or combined.

In other embodiments, the higher aldehydes (A) can be at least partial replacements for the conventional formaldehyde (F) components. For example, at least 5, 10, or 20% and/or up to 20, 30, 40, or 50% of the aldehyde groups in the initial aqueous reaction mixture can be from a formaldehyde reactant, such as where at least 50, 60, 70, 80, or 90% and/or up to 80, 90, or 95% of the aldehyde groups in the initial aqueous reaction mixture can be from aldehyde(s) having at least 2 carbon atoms and having at least 1 or 2 aldehyde functional groups. In other embodiments, at least 20, 30, 40, 50, 60, or 70% and/or up to 60, 70, 80, 90, or 95% of the aldehyde groups in the initial aqueous reaction mixture can be from a formaldehyde reactant, such as where at least 5, 10, 20, 30, or 40% and/or up to 30, 40, 50, 60, 70, or 80% of the aldehyde groups in the initial aqueous reaction mixture can be from aldehyde(s) having at least 2 carbon atoms and having at least 1 or 2 aldehyde functional groups.

In a refinement, the method further comprises adding the aldehyde having at least 2 carbon atoms and having at least 1 aldehyde functional group to the aqueous reaction mixture in a controlled manner and in the presence of at least some base catalyst, thereby catalyzing a condensation reaction between the lignin and the aldehyde while maintaining a viscosity of aqueous reaction mixture below a gelation point of the aqueous reaction mixture.

In a refinement, the resin reaction product has a pH value (e.g., determined according to the method described below) of 8 to 12 or 10 to 11. For example, the pH value can be at least 8, 9, 9.5 or 10 and/or up to 10.5, 11, 11.5, or 12. In a further refinement, the aqueous reaction mixture can further comprise formaldehyde in addition to the aldehyde having at least 2 carbon atoms and having at least 1 aldehyde functional group. For example, 60% to 80% of the aldehyde groups in the initial aqueous reaction mixture can be from a formaldehyde reactant and/or 20% to 40% of the aldehyde groups in the initial aqueous reaction mixture can be from aldehyde(s) having at least 2 carbon atoms and having at least 1 or 2 aldehyde functional groups.

In a refinement, the resin reaction product has an alkalinity value (e.g., determined according to the method described below) of 1% to 5% or 2% to 3%. For example, the alkalinity value can be at least 1, 1.5, or 2% and/or up to 2, 2.5, 3, 4 or 5%. In a further refinement, the aqueous reaction mixture can optionally further comprise formaldehyde in addition to the aldehyde having at least 2 carbon atoms and having at least 1 aldehyde functional group. For example, 0% to 50%, 5% to 50%, or 10% to 50% of the aldehyde groups in the initial aqueous reaction mixture can be from a formaldehyde reactant and/or 50% to 100%, 50% to 95%, or 50% to 90% of the aldehyde groups in the initial aqueous reaction mixture can be from aldehyde(s) having at least 2 carbon atoms and having at least 1 or 2 aldehyde functional groups.

In a refinement, the resin reaction product has a gelation time (e.g., determined according to the method described below) of 2 min to 50 min, 4 min to 50 min, or 4 min to 30 min. For example, the gelation time can be at least 2, 4, 5, 6, 8, 10, 12, 15, 20, or 30 min and/or up to 6, 9, 12, 15, 18, 21, 25, 30, 35, 40, or 50 min. In a further refinement, the aqueous reaction mixture can optionally further comprise formaldehyde in addition to the aldehyde having at least 2 carbon atoms and having at least 1 aldehyde functional group. For example, 0% to 50%, 5% to 50%, or 10% to 50% of the aldehyde groups in the initial aqueous reaction mixture can be from a formaldehyde reactant and/or 50% to 100%, 50% to 95%, or 50% to 90% of the aldehyde groups in the initial aqueous reaction mixture can be from aldehyde(s) having at least 2 carbon atoms and having at least 1 or 2 aldehyde functional groups.

In a refinement, a molar ratio of aromatic hydroxy groups to aldehyde functional groups in the aqueous reaction mixture (e.g., as initially provided) is less than 1. The resin formed can be a resol resin when there is an excess of aldehyde groups relative to aromatic hydroxy groups and a base catalyst. The ratio can be a molar ratio based on total aromatic hydroxy groups and total aldehyde reactants. A suitable lignin:aldehyde ratio (or aromatic hydroxy group: aldehyde ratio) can be about 1:2, for example at least 1:4 or 1:3 and/or up to 1:2, 1:1.5, or 1:1.1. The base catalyst is not particularly limited, and sodium hydroxide is conveniently used a low-cost catalyst and means to solubilize the lignin in the aqueous reaction mixture.

In a refinement, the method further comprises: adding one or more adhesive components to the aqueous reaction mixture at or after the completion point, the adhesive components being selected from the group consisting of fillers, further catalyst, and further water; and continuing the condensation reaction between remaining unreacted ortho-reactive carbon atoms and the substituted methylol or hydroxyoxylated groups in the resin reaction product, thereby forming a crosslinked adhesive composition (e.g., networked or otherwise cured product). As described above, the substituted methylol groups result from the initial condensation reaction between aldehyde groups of the aldehyde reactant and the ortho-reactive carbon atoms of the lignin reactant. During the curing portion of the condensation reaction, any unreacted aldehyde functional groups also can react, for example by reacting with a substrate, reacting to form further substituted methylol groups (e.g., which can in turn condense to form a crosslink), etc. The fillers are not particularly limited and can include polysaccharides such as starches, and/or lignocellulosic biomass such as woody fibers (e.g., wood flour, alder bark, etc.) The fillers can perform a variety of functions, for example providing a thickener for the adhesive composition prior to curing, an absorbent for excess water in the adhesive composition, a mechanical reinforcement for the cured adhesive composition, etc. In some embodiments, reactive functional groups on the fillers can react with the remaining aldehyde groups during curing.

In a further refinement, the method further comprises continuing the condensation reaction at a reaction temperature in a range from 100° C. to 200° C., 120° C. to 180° C., or 130° C. to 180° C. while crosslinking. The reaction temperature for the subsequent condensation reaction to form the cured/crosslinked reaction product is not particularly limited, for example being at least 100, 110, 120, or 130° C. and/or up to 160, 170, 180, 190, or 200° C. The curing reaction is typically performed under pressure, for example in a press with the adhesive composition being cured between two substrates. For example, the curing pressure can be at least 8, 10, 12, or 14 bar and/or up to 16, 18, or 20 bar. The curing reaction time can be selected as desired and in view of the temperature and pressure conditions, but it typically can range from about 1-10 min for common curing conditions. Suitably, the reaction conditions are controlled such that there are substantially no remaining unreacted aldehyde groups. For example, in the crosslinked adhesive composition, the is suitably not more than 2, 1, 0.5, 0.2, or 0.1% free aldehyde (e.g., on a weight or molar basis), for example relative to the initial aldehyde used in the reaction.

In a further refinement, the method further comprises continuing the condensation reaction when the aqueous reaction mixture is in contact with one or more substrates (e.g., two or more substrates to be joined by the final cured adhesive). The substrate is not particularly limited and generally can be formed from any material. Suitably, the substrate is formed from wood or otherwise includes wood as a component of the substrate surface bonded with the adhesive.

In another aspect, the disclosure relates to a method for forming an adhesive composition, the method comprising: providing a resin reaction product formed according to any of the disclosed embodiments (e.g., by performing the initial condensation reaction to the non-crosslinked completion point); adding one or more adhesive components to the aqueous reaction mixture containing the resin reaction product, the adhesive components being selected from the group consisting of fillers, further catalyst, and further water; and continuing the condensation reaction between remaining unreacted ortho-reactive carbon atoms and the substituted methylol groups in the resin reaction product, thereby forming a crosslinked adhesive composition.

In another aspect, the disclosure relates to an adhesive composition formed by any of the disclosed embodiments including an uncrosslinked resin reaction product (e.g., a resin composition formed at the completion point of the initial reaction and that can be used in a subsequent adhesive formulation).

In another aspect, the disclosure relates to a crosslinked adhesive composition formed by any of the disclosed embodiments (e.g., fully cured/crosslinked resin composition after addition of other adhesive components, for example in the form of an article having one or more substrates with the crosslinked adhesive composition coated thereon, such as joining two or more substrates).

While the disclosed methods, compositions, and articles are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

BRIEF DESCRIPTION OF THE DRAWINGS

For a more complete understanding of the disclosure, reference should be made to the following detailed description and accompanying drawings wherein.

DETAILED DESCRIPTION

Figure 1:
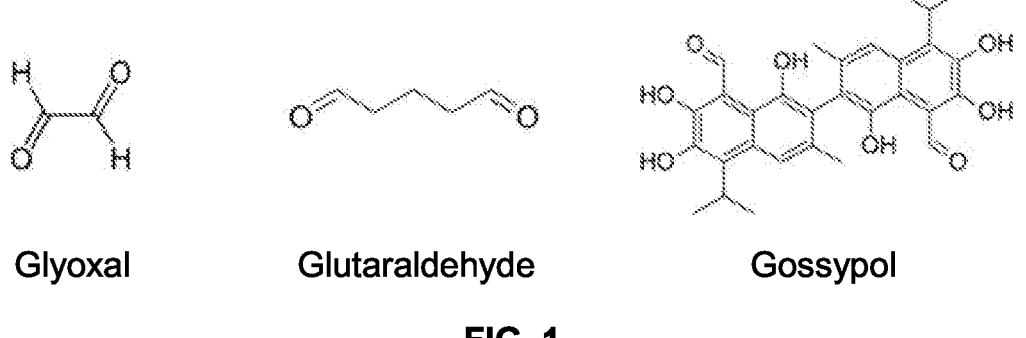
FIG. 1 illustrates chemical structures of representative aldehydes suitable as at least partial formaldehyde replacements according to the disclosure.

The disclosure relates to adhesive compositions, including non-crosslinked resins and crosslinked/cured adhesives joining substrates, as well as related methods for making the compositions and articles. Compared to a conventional phenol (P) and formaldehyde (F) resin, the disclosed methods and compositions use lignin (L) and higher aldehydes (A) as corresponding replacements to provide an analog to a conventional PF resin with biobased reactants. In general, however, there are three major obstacles in using lignin as a phenol replacement in a corresponding composition/adhesive: 1) low reactivity, 2) high molecular weight, and 3) high polydispersity.

Low reactivity of lignin in comparison with phenol is due to the fact that phenol has three available positions for reaction with an aldehyde such as formaldehyde (one para and two ortho positions), whereas in lignin macromolecules, the para position typically participates in intramolecular linkages and so is not available for reaction. Furthermore, if the starting material is syringyl, guaiacyl, or hydroxy-phenyl lignin, there are none, one, or two ortho positions available for reaction with formaldehyde, respectively. Therefore, hardwood lignin that contains a high concentration of syringyl lignin with two ortho positions filled with methoxyl ($-OCH_3$) groups is less suitable for phenolic resin production. Softwood lignin with a higher concentration of guaiacyl units that has at least one free ortho position is better suited than hardwood, but still less reactive than grass lignins. In contrast, lignin samples having a high concentration of hydroxyphenyl lignin units are particularly suitable a phenol replacement, because the hydroxyphenyl lignin has two free ortho positions for reaction with an aldehyde-functional co-reactant.

The second problem in using lignin as a phenol substitute is the complex 3D structure of lignin and its high molecular weight. The higher the molecular weight, the lower the reactivity of lignin toward any chemical reactions. The 3D structure of lignin also limits the accessibility of reactants. Therefore, a lignin to be used as a phenol replacement suitably has a relatively low molecular weight, for example below 1000 or below 5000. The low molecular weight depends on the extraction process and the number of linkages broken during the isolation process.

Molecular heterogeneity is a third challenge to applications of lignin and other natural polymers. For instance, lignin, unlike many synthetic polymers, has relatively high polydispersity, or in other words, contains a wide range of molecular sizes. The lower the polydispersity, or having a more consistent molecular size, facilitates the formation of more reproducible resins with predictable properties. When considering reactions between phenols with aldehydes, the most active sites in the phenolic reactant are the para and then ortho positions. The para positions in lignins are sterically hindered and not free for subsequent reactions; therefore, lignins having a comparatively high fraction of free ortho positions are preferred. In this regard, hydroxyphenyl lignin is a particularly suitable lignin component/source, followed by guaiacyl lignin from coniferous trees (softwood). It is further preferable to use a lignin feedstock having a comparatively low molecular weight and narrow molecular weight distribution (i.e., a low polydispersity). Given similar chemistry, a lower molecular weight increases the reactivity of the lignin, and a lower polydispersity improves the homogeneity of the corresponding resins (i.e., which thus have more reproducible properties).

The present disclosure addresses problems in forming lignin-aldehyde (LA) adhesives using alternative components relative to conventional phenol-formaldehyde (PF) adhesives. Due to the differing reactivity of the LA components compared to the PF components, the initial condensation reaction between ortho-reactive sites in the lignin and the aldehyde is controlled to prevent the gelation of the aqueous reaction mixture while reacting substantially all of the LA reactants to provide a non-crosslinked resin reaction product. The resin reaction product can then be cured at high temperature/high pressure conditions to provide a cross-linked adhesive, for example joining two substrates. The biobased LA resin can be used to formulate phenolic adhesives, coatings, and elastomers. The LA adhesive has a similar dry adhesion strength as compared to a PF adhesive. The LA adhesive can be used, for example, in the manufacturing of plywood, particleboard, fiberboard, oriented strand board (OSB), other engineered wood products, and mass timber products.

Adhesive Composition

An adhesive composition according to the disclosure is generally formed from an aqueous reaction mixture including water, a lignin, and an aldehyde having at least 2 carbon atoms and having at least 1 aldehyde functional group (—CHO). A base catalyst is added to the aqueous reaction mixture in a controlled manner to catalyze a condensation reaction between the lignin and the aldehyde while maintaining a viscosity of aqueous reaction mixture below a gelation point of the aqueous reaction mixture. The condensation reaction between the lignin and the aldehyde is continued while maintaining the viscosity of the aqueous reaction mixture below its gelation point until its completion point is reached and a corresponding resin reaction product is formed. At the completion point, at least some unreacted ortho-reactive carbon atoms remain, and at least some substituted methylol functional groups have been formed by the condensation reaction and are present in the resin reaction product.

Plants, in general, are comprised of cellulose, hemicellulose, lignin, extractives, and ash. Lignin typically constitutes 15-35 wt. % of plant cell walls, is an amorphous aromatic polymer made of phenylpropane units (e.g., coniferyl alcohol, sinapyl alcohol, p-coumaryl alcohol). The lignin for use according to the disclosure includes aromatic hydroxyl groups and ortho-reactive carbon atoms relative to the hydroxyl groups, but can otherwise be obtained from a variety of sources and isolations method. For example, the lignin can be derived from one or more types of biomass such as hardwoods, softwoods, grasses (e.g., agricultural residues). Similarly, the lignin can be isolated from an extraction process such as Kraft extraction, soda extraction, organosolv extraction, enzymatic hydrolysis extraction, ionic liquid, extraction, and sulfite extraction.

In various embodiments, the lignin, prior to condensation reaction and/or incorporation into the aqueous reaction mixture, can be selected such that it has one or more structural features related to the molecular weight and/or weight distribution of its polymer chains, chemical structure and/or amount of its hydroxyl groups, chemical structure and/or amount of its ortho-reactive carbon sites. For example, in an embodiment, the lignin can have a molecular weight in a range of 500 to 50000, 1000 to 50000, 500 to 20000, or 3000 to 5000. In an embodiment, the lignin can have a polydispersity in a range of 1.2 to 10, 1.2 to 5, or 2 to 4. In an embodiment, the lignin can have an aliphatic hydroxyl content in a range of 1 to 5 mmol/g, 1 to 4 mmol/g, or 1 to 3 mmol/g. In an embodiment, the lignin can have a phenol hydroxyl content in a range of 1 to 6 mmol/g, 2 to 6 mmol/g, or 3 to 6 mmol/g. In an embodiment, the lignin can have a total hydroxyl content in a range of 3 to 9 mmol/g or 4 to 7 mmol/g. In an embodiment, the lignin can have a weight-average molecular weight of 2000 or less, or 5000 or less. In an embodiment, the lignin can have a polydispersity of 2.0 or less, or 3.0 or less. In an embodiment, at least 50% or at least 60% of the aromatic hydroxy groups in the lignin have at least 1 ortho-reactive carbon relative to the hydroxy group (e.g., 1 or 2 ortho-reactive carbons).

Lower molecular weights and low polydispersities are desirable to promote access to and reactivity of the aromatic hydroxy groups of the lignin, but lignin with any molecular weight and/or polydispersity can be used. Suitably, the weight-average molecular weight ($M_w$) is at least 500, 800, or 1200 and/or up to 1000, 1200, 1500, 2000, 5000, or 10000, but higher values are possible. Similarly, the polydispersity ($M_w/M_n$, where $M_n$ is the number-average molecular weight) is at least 1.2, 1.3, 1.4, or 1.5 and/or up to 1.5, 1.8, 2.0, 3.0, or 4.0, but higher values are possible.

Likewise, a lignin having aromatic hydroxy groups with available ortho-reactive carbon atoms adjacent to the hydroxy group on the lignin phenolic residue is suitable for the condensation reaction with the aldehyde groups. The carbon atoms in the phenolic ring and adjacent to the hydroxy group are particularly suitable for condensation reaction with aldehydes when they contain a hydrogen atom attached to the ring (e.g., instead of a methoxy or other alkoxy or blocking group). A lignin phenolic residue with two ortho-reactive carbon atoms generally corresponds to a hydroxyphenyl residue, a lignin phenolic residue with one ortho-reactive carbon atom generally corresponds to a guaiacyl residue, and a lignin phenolic residue with zero ortho-reactive carbon atoms generally corresponds to a syringyl residue. Suitably, at least 60, 70, 80, 85, 90, or 95% and/or up to 90, 95, 98, or 100% of the aromatic hydroxy groups in the lignin have 1 or 2 ortho-reactive carbon atoms. Alternatively or additionally, at least 10, 20, 30, 40, 50, 60, 70, or 80% and/or up to 40, 60, 80, 90, or 100% of the aromatic hydroxy groups in the lignin have 1 ortho-reactive carbon atom. Alternatively or additionally, at least 10, 20, 30, 40, 50, 60, 70, or 80% and/or up to 40, 60, 80, 90, or 100% of the aromatic hydroxy groups in the lignin have 2 ortho-reactive carbon atoms. The relative distribution of hydroxyphenyl, guaiacyl, and syringyl residues in a lignin sample can be controlled or selected according to the method used to extract the lignin from a biomass sample. The total aromatic hydroxy content (or phenolic hydroxyl content) of the lignin suitably is in a range of 2 to 5 mmol/g or 1 to 6 mmol/g. In an embodiment, the lignin can have a phenol hydroxyl content of at least 1, 1.5, 2, 2.5, or 3 mmol/g and/or up to 2, 2.5, 3, 4, 5, or 6 mmol/g.

An aldehyde reactant can be generically represented by R—CHO. The R group an include one or more aldehyde groups itself for the di- or higher aldehydes according to the disclosure (e.g., R is CHO for glyoxal). Similarly, the R group can be an alkyl group for a monoaldehyde, for example where R is $CH_3$ for acetaldehyde, and R is H for formaldehyde (e.g., as a possible co-reactant with the aldehydes having at least two carbon atoms). In various embodiments, the aldehyde can have 2 to 50 carbon atoms and has

12 aldehyde having at least two carbon atoms (e.g., and also at least two aldehyde groups) according to the disclosure.

FIG. 1 illustrates some chemical structures of representative aldehydes suitable as at least partial formaldehyde replacements according to the disclosure, including glyoxal, (a dialdehyde), glutaraldehyde (an aliphatic 5-carbon dialdehyde), and gossypol (a polyphenolic aldehyde derived from unrefined cottonseed oil). Although not illustrated in FIG. 1, oxidized starch is another suitable formaldehyde replacement. Starch is another biobased polymer that can be oxidized under controlled conditions to form aldehyde groups on the starch backbone that could also serve as a biobased aldehyde for phenolic resin compositions. A benefit of at least partial replacement of formaldehyde with glyoxal and glutaraldehyde are that glyoxal and glutaraldehyde are not carcinogenic. Although in some cases, glyoxal and glutaraldehyde have some toxicity levels similar to formaldehyde, they are not categorized as flammables, which makes them more suitable for transport and storage. On the other hand, gossypol has very low toxicity but is classified as a carcinogen. Oxidized starch has good properties in terms of being generally non-toxic and non-hazardous, but it should be controlled or selected so that it does not introduce too many free hydroxyl groups to the adhesive composition, which hydroxyl groups could negatively affect its water resistance. In some embodiments, mixtures of different aldehydes can be used to control or reduce hazard and/or toxicity levels.

Table 1 below provides a summary of the relative hazard and toxicity properties of formaldehyde as compared to representative replacement aldehydes according to the disclosure.

TABLE 1

| | | | Comparative Aldehyde Toxicity Data | | |
|---|---|---|---|---|---|
| Property | Formaldehyde | Glyoxal | Glutaraldehyde | Gossypol | Starch |
| Flammable liquids | Cat #4, H227 | — | — | — | — |
| Acute toxicity, Oral | Cat #3, H301 | — | Cat #4, H302 | — | — |
| Acute toxicity, Inhalation | Cat #3, 11331 | — | Cat #4, H332 | — | — |
| Acute toxicity, Dermal | Cat #3, H311 | — | — | — | — |
| Skin corrosion | Cat #1B, H314 | — | Cat #1B, H314 | — | — |
| Skin irritation | — | Cat #2, H315 | — | — | — |
| Serious eye damage | Cat #1, H318 | Cat #1, H318 | Cat #1, 11318 | — | — |
| Respiratory Sensitisation | — | — | Cat #1, 11334 | — | — |
| Skin sensitisation | Cat #1, H317 | Cat #1, H317 | Cat #1, H317 | — | — |
| Germ cell mutagenicity | Cat #2, H341 | Cat #2, H341 | Cat #2, H341 | — | — |
| Carcinogenicity | Cat #1A, H350 | — | — | Cat #2, H351 | — |
| Specific target organ toxicity - single exposure | Cat #1, H370 | — | Cat #3, 11335 | — | — |
| Acute aquatic toxicity | Cat #3, H402 | — | Cat #1, H400 | — | — |
| Chronic Aquatic Toxicity | — | — | Cat #2, H411 | — | — |

1 to 4 or 2 to 4 aldehyde functional groups. Suitably, the aldehyde has at least 2, 4, 6, 8, or 10 carbon atoms and/or up to 4, 6, 8, 10, 20, 30, 50, or more carbon atoms. Alternatively or additionally, the aldehyde can have 1, 2, 3, 4, or more aldehyde groups. In an embodiment, the aldehyde is an at least di-functional aldehyde (i.e., having 2 or more aldehyde groups). Examples of suitable aldehydes include glyoxal ($C_2$ dialdehyde), glutaraldehyde ($C_5$ dialdehyde), gossypol ($C_{30}$ polyaromatic dialdehyde), oxidized starch (polymeric polyaldehyde), etc. In some embodiments, formaldehyde can be included in the aqueous reaction mixture along with the In some embodiments, the aqueous reaction mixture is free from at least one of phenol and/or formaldehyde, for example as originally provided or prior to condensation reaction. The resin and adhesive according to the disclosure preferably uses complete replacement of phenol (P) and/or formaldehyde (F) with lignin (L) and/or higher aldehydes (A), respectively, to provide an analog to a conventional PF resin with biobased reactants. Suitably, the aqueous reaction mixture contains less than 10, 5, 2, 1, or 0.1 wt. % of phenol and/or formaldehyde, whether individually or combined. Alternatively or additionally, the adhesive composition (e.g., crosslinked or uncrosslinked) can similarly contain less than 10, 5, 2, 1, or 0.1 wt. % of phenol units and/or formaldehyde units (i.e., as resulting condensation units in the reaction product), whether individually or combined.

In other embodiments, the higher aldehydes (A) can be at least partial replacements for the conventional formaldehyde (F) components. For example, at least 5, 10, or 20% and/or up to 20, 30, 40, or 50 wt. % of the aldehyde groups in the initial aqueous reaction mixture can be from a formaldehyde reactant, such as where at least 50, 60, 70, 80, or 90 wt. % and/or up to 80, 90, or 95 wt. % of the aldehyde groups in the initial aqueous reaction mixture can be from aldehyde(s) having at least 2 carbon atoms and having at least 1 or at least 2 aldehyde functional groups. Alternatively or additionally, the adhesive composition (e.g., crosslinked or uncrosslinked) can similarly contain at least 5, 10, or 20 wt. % and/or up to 20, 30, 40, or 50 wt. % formaldehyde units, and at least 50, 60, 70, 80, or 90 wt. % and/or up to 80, 90, or 95 wt. % aldehyde units from aldehyde(s) having at least 2 carbon atoms and having at least 1 or at least 2 aldehyde functional groups. In other embodiments, at least 20, 30, 40, 50, 60, or 70% and/or up to 60, 70, 80, 90, or 95% of the aldehyde groups in the initial aqueous reaction mixture can be from a formaldehyde reactant, such as where at least 5, 10, 20, 30, or 40% and/or up to 30, 40, 50, 60, 70, or 80% of the aldehyde groups in the initial aqueous reaction mixture can be from aldehyde(s) having at least 2 carbon atoms and having at least 1 or 2 aldehyde functional groups.

In an embodiment, the molar ratio of aromatic hydroxy groups to aldehyde functional groups in the aqueous reaction mixture is less than 1, for example as originally provides or prior to condensation reaction. The resin formed can be a resol resin when there is an excess of aldehyde groups relative to aromatic hydroxy groups and a base catalyst. The ratio can be a molar ratio based on total aromatic hydroxy groups and total aldehyde reactants. A suitable lignin:aldehyde ratio (or aromatic hydroxy group:aldehyde ratio) can be about 1:2, for example at least 1:4 or 1:3 and/or up to 1:2, 1:1.5, or 1:1.1. The base catalyst is not particularly limited, and sodium hydroxide is conveniently used a low-cost catalyst and means to solubilize the lignin in the aqueous reaction mixture.

Adding the catalyst in a controlled manner can generally include selecting a catalyst concentration, adding the catalyst batchwise (e.g., in 2, 3, 4, or more batch additions) or continuously over time, etc. in a manner that promotes the rate of the condensation reaction, but which prevents the condensation reaction from proceeding too rapidly in a manner that would cause gelation via excessive crosslinking during resin formation. This promotes reaction and higher conversion of a larger proportion of the lignin and aldehyde reactants. Without control of the reaction rate, it is possible for a relatively smaller fraction of the lignin and aldehyde reactants to rapidly react, crosslink, and gel, which in turn prevents further reaction of other ortho-reactive carbon atoms and unreacted aldehyde groups in the reactants (e.g., monomers, short oligomers, etc.). This results in low overall reactant conversion and/or a reaction product that is not suitable for use as an adhesive.

In an embodiment, the method further includes adding the aldehyde reactants in a controlled manner to advance the condensation reaction between the lignin and the aldehyde while maintaining a viscosity of aqueous reaction mixture below a gelation point of the aqueous reaction mixture. The aldehyde reactants, for example those with at least 2 carbon atoms alone or in combination with formaldehyde, are added to the aqueous reaction mixture in the presence of at least some base catalyst to catalyze the condensation reaction. For example, an initial step of providing the aqueous reaction mixture can include adding the aldehyde reactants in a controlled manner to an aqueous solution containing the water, the lignin, and base catalyst to begin the condensation reaction. Subsequent or concurrent addition of further base catalyst can be performed to further catalyze the condensation reaction as a controlled addition of the base catalyst. Similar to the catalyst, adding the aldehyde reactants in a controlled manner can generally include selecting a aldehyde concentration, adding the aldehyde batchwise (e.g., in 2, 3, 4, or more batch additions) or continuously over time, etc. in a manner that promotes the rate of the condensation reaction, but which prevents the condensation reaction from proceeding too rapidly in a manner that would cause gelation via excessive crosslinking during resin formation. This similarly promotes reaction and higher conversion of a larger proportion of the lignin and aldehyde reactants, while limiting or preventing crosslinking and gelation.

Suitably, the resin reaction product is not crosslinked at the completion point. Thus, while aldehyde groups and ortho-reactive carbon atoms have reacted to form (substituted) methylol or alkylol groups at the ortho sites of the aromatic hydroxyl groups in the lignin, a networked or crosslinked thermoset polymer with (substituted) methylene, alkylene, or glyoxylene groups linking ortho sites of two lignin aromatic groups has not yet formed. In the context of a generic aldehyde reactant represented by R—CHO, the (substituted) methylol groups present at the completion point and linked to the ortho sites are correspondingly represented by —CHR—OH. Aldehyde groups in R could remain as aldehyde groups at this point, and/or aldehyde groups in R could also react with other ortho sites to form additional substituted methylol groups. The (substituted) methylene groups present after curing/crosslinking (and preferably absent at the completion point) and linking two ortho sites are correspondingly represented by —CHR—. Although the (substituted) methylene groups are formed mainly during crosslinking step, they can be formed in the condensation step of the resin synthesis to some extent (e.g., increasing the molecular weight as the resin reaction proceeds), but not to an extent that would cause gelation or substantial crosslinking. As used herein, the condensation reaction for the initial resin formation can include (1) addition of the aldehyde reactant to reactive ortho sites to form (substituted) methylol or alkylol groups as well as (2) some water elimination/formation as (substituted) methylol or alkylol groups react with other ortho sites to form a small degree of (substituted) methylene groups that link aromatic units but which do not cause gelation or otherwise significantly crosslink the resin reaction product. Subsequent continuation of the condensation reaction during crosslinking or curing of an adhesive formulation generally continues the water elimination/formation reaction to form larger degree of (substituted) methylene groups that result in a crosslinked or networked adhesive product. Aldehyde groups originally in R could have been converted to additional substituted methylene groups, and/or could have reacted with functional groups on a (wood) substrate or filler during curing. A reaction product that has passed the completion point and begun to crosslink is generally insoluble in the aqueous reaction medium and can be identified by solids (e.g., precipitate) in the reaction medium. Accordingly, the aqueous reaction medium is suitably substantially free from solid or precipitate material at the completion point (e.g., less than 0.1 or 0.01 wt. % solids not dissolved or otherwise in solution).

The condensation reaction can proceed both during and after catalyst addition, and the condensation reaction is controlled to avoid gelation during both phases. The completion point reflects a point during the reaction at which a substantial amount of the aldehyde groups and ortho-reactive carbon atoms have reacted to form (substituted) methylol groups at the ortho sites of the aromatic hydroxyl groups in the lignin, but there has not been any substantial cross-linking. At least some ortho-reactive carbon atoms remain at the completion point and are available for further reaction during curing. For example, the (substituted) methylol groups can react during curing with other ortho-reactive carbon atoms to form the (substituted) methylene groups linking adjacent aromatic groups. Any remaining aldehyde groups can react during curing with a substrate functional group (e.g., lignocellulosic group in a wood substrate), a filler functional group (e.g., for a lignocellulosic or polysaccharide filler), and/or other ortho-reactive carbon atoms in lignin moieties. The completion point can represent a point at which the condensation reaction is terminated/halted, for example by freezing or otherwise cooling the aqueous reaction mixture containing the partially reacted resin, such as for storage until subsequent use as a resin to form an adhesive. The completion point also can represent a point at which other adhesive/glue formulation components are added to the aqueous reaction mixture containing the partially reacted resin for further curing and adhesive formation.

A variety of suitable reaction conditions (e.g., time, temperature, or pressure) for forming the adhesive composition in its non-crosslinked (or uncured) resin state are possible as long as the reaction is monitored and controlled to avoid gelation. For example, the resin reaction product can be formed at a reaction temperature in a range from 40° C. to 95° C. or 65° C. to 85° C. while avoiding gelation and crosslinking. The reaction temperature for the initial condensation reaction to form the resin reaction product is not particularly limited, for example being at least 40, 50, 60 or 65° C. and/or up to 70, 80, 85, 90, or 95° C. The reaction pressure is suitably atmospheric pressure, for example 0.8 to 1.2 bar or 0.9 to 1.1 bar. The reaction time can be selected as desired and in view of the temperature and pressure conditions, but it typically can range from about 1-2 hr or 1-4 hr for common reaction conditions. Suitably, the reaction conditions are controlled such that substantially all of the initial aldehyde reactant has reacted to form at least one corresponding substituted methylol group at an ortho-reactive site, but it is possible that at least some pendant (unreacted) aldehyde groups remain. For example, a glyoxal molecule having reacted with one ortho-reactive carbon will form one substituted methylol group and retain one unreacted aldehyde group. Similarly, a glyoxal molecule having reacted with two ortho-reactive carbons will form two substituted methylol groups and have no remaining unreacted aldehyde groups. For example, at the completion point, at least 90, 95, 98, 99, or 99.9% of the initial aldehyde (e.g., on a weight or molar basis) has reacted to form at least one corresponding substituted methylol group, in particular while avoiding crosslinking.

The non-crosslinked resin reaction product can be cured or crosslinked using methods and additional additives as generally known in the art for phenol-formaldehyde resins. For example, one or more adhesive components can be added to the resin reaction product or to the aqueous reaction mixture at or after the completion point. Examples of suitable adhesive components include fillers or biofillers, further catalyst, and/or further water. After the addition of the additional adhesive components, the condensation reaction is continued between remaining unreacted ortho-reactive carbon atoms and the substituted methylol groups in the resin reaction product, thereby forming a crosslinked adhesive composition (e.g., networked or otherwise cured product). As described above, the substituted methylol groups result from the initial condensation reaction between aldehyde groups of the aldehyde reactant and the ortho-reactive carbon atoms of the lignin reactant. During the curing portion of the condensation reaction, any unreacted aldehyde functional groups also can react, for example by reacting with a substrate, reacting to form further substituted methylol groups (e.g., which can in turn condense to form a crosslink), etc.

A variety of suitable reaction conditions (e.g., time, temperature, or pressure) for curing or crosslinking the adhesive composition are possible. For example, continuation of the condensation reaction for curing can be performed at a reaction temperature in a range from 100° C. to 200° C., 120° C. to 180° C., or 130° C. to 180° C. while crosslinking. The reaction temperature for the subsequent condensation reaction to form the cured/crosslinked reaction product is not particularly limited, for example being at least 100, 110, 120, or 130° C. and/or up to 160, 170, 180, 190, or 200° C. The curing reaction is typically performed under pressure, for example in a press with the adhesive composition being cured between two substrates. For example, the curing pressure can be at least 8, 10, 12, or 14 bar and/or up to 16, 18, or 20 bar. The curing reaction time can be selected as desired and in view of the temperature and pressure conditions, but it typically can range from about 1-10 min for common curing conditions. Suitably, the reaction conditions are controlled such that there are substantially no remaining unreacted aldehyde groups. For example, in the crosslinked adhesive composition, the is suitably not more than 2, 1, 0.5, 0.2, or 0.1% free aldehyde (e.g., on a weight or molar basis), for example relative to the initial aldehyde used in the reaction.

As described below, the curing or crosslinking of the adhesive composition can be performed when resin composition is in contact with one or more substrates (e.g., two or more substrates to be joined by the final cured adhesive), for example a wood or other substrate to form a corresponding article.

In an embodiment, the adhesive composition can include any suitable organic or inorganic filler or additive, which can be included to improve one or more of mechanical properties, optical properties, electrical properties, oil-resistance properties, and water-resistance properties of the final composition after curing or crosslinking to a completion point. The fillers or additives can be added to the adhesive composition prior to curing, for example being dispersed, dissolved, etc. in a non-crosslinked, uncured, or incompletely crosslinked/cured resin composition. In some embodiments, the fillers can include biobased fillers, for example polysaccharides such as starches, and/or lignocellulosic biomass such as woody fibers (e.g., wood flour, alder bark, etc.). The fillers can perform a variety of functions, for example providing a thickener for the adhesive composition prior to curing, an absorbent for excess water in the adhesive composition, a mechanical reinforcement for the cured adhesive composition, etc. In some embodiments, reactive functional groups (e.g., hydroxy groups) on the biobased fillers can react with remaining aldehyde groups during curing. Examples of other suitable fillers or additives include nanoclay, graphene oxide, graphene, silicon dioxide (silica), aluminum oxide, diatomaceous earth, cellulose nanocrystals, carbon nanotubes, titanium dioxide (titania), and combinations or mixtures thereof. In addition, the fillers can include biocides, pigments, dyes, a thermoplastic material, or a combination thereof. The fillers, whether organic, biobased, inorganic, etc. can be collectively or individually included in the range from 0.01 wt. % to 10 wt. % or 0.01 wt. % to 20 wt. %, for example in range from 1 wt. % to 5 wt. %, based on the total weight of the adhesive composition (e.g., combined weight of a networked, crosslinked polymerization product and all other additives combined).

Article

Figure 2:
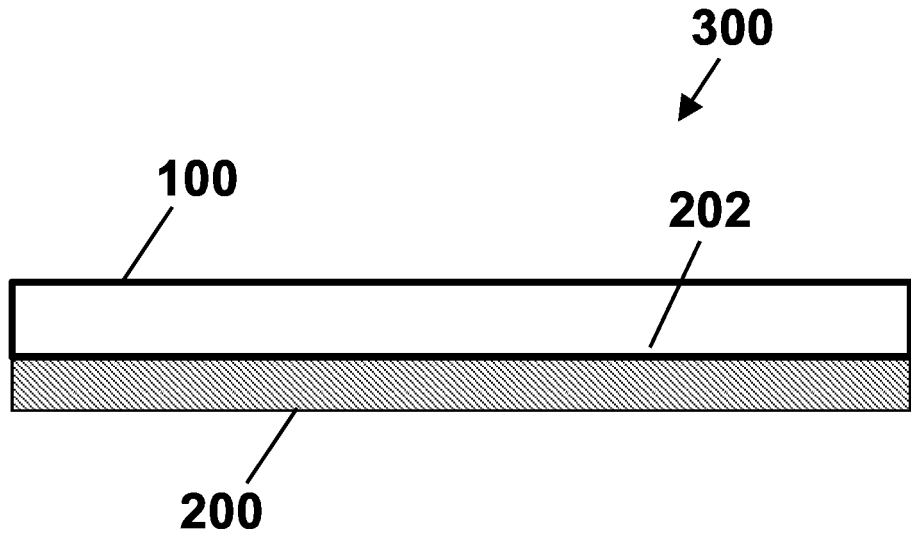
FIG. 2 illustrates an article according to the disclosure in which the crosslinked adhesive composition is a coating on a substrate.
Figure 3:
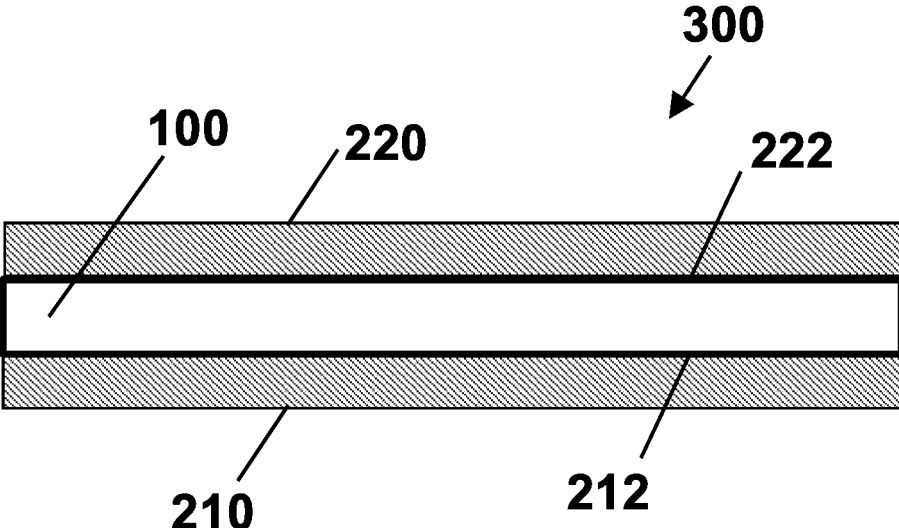
FIG. 3 illustrates an article according to the disclosure in which the crosslinked adhesive composition is an adhesive joining two substrates.

FIG. 2 illustrates an aspect of the disclosure in which an article 300 (e.g., coated article) includes a substrate 200 and the cured or crosslinked adhesive composition 100 coated on a surface 202 of the substrate 200. The cured composition 100 can be in the form of a coating or film on an external, environment-facing surface 202 of the substrate 200 (e.g., where the surface 202 would otherwise be exposed to the external environment in the absence of the composition 100). In this case, the cured composition 100 provides protection to the underlying substrate 200 (e.g., one or more of water-resistance, oil-resistance, mechanical strength, etc.). FIG. 3 illustrates an aspect of the disclosure in which an article 310 includes a first substrate 210, a second substrate 220, and the cured composition 100 coated on internal surfaces 212, 222 of the substrates 210, 220. In this case, the cured composition 100 can be in the form of an adhesive or bonding coating or film on the internal substrate surfaces, which coating or film joins the opposing substrates 210, 220. In another embodiment, the cured composition 100 can provide a polymeric matrix or binder in a composite product mixed with different type of natural or synthetic fibers, fillers, or substrates, for example as an engineered wood product such as plywood, particle board, fiber board, oriented strand board (OSB), etc.

The substrates are not particularly limited, and generally can be formed from any material(s) desired for protection, adhesion, or otherwise with the adhesive composition, in particular given the good, broad adhesive capabilities of the crosslinked adhesive composition. For example, the substrate can be a wood or other lignocellulosic material, a metal, plastic, a different thermoset material (e.g., a primer material; material other than the other than the adhesive composition), glass, fabric (or textile), or ceramic material. Examples of specific metals include steel, aluminum, copper, etc. Examples of specific plastics include polyvinyl alcohol (PVOH), ethylene vinyl alcohol (EVOH), polyethylene terephthalate (PET), polypropylene (PP), polyethylene (PE), polylactic acid (PLA), starch, chitosan, etc. In an embodiment, the substrate can be in the form of a three-dimensionally printed substrate, whether formed from a polymeric/plastic material or otherwise. Suitable wood materials can be any type of wood commonly used in home, office, and outdoor settings. Suitable glass materials can be those used for building windows, automobile windows, etc. In some embodiments, the substrate is a top layer of a coating or series of coatings on a different underlying substrate. For example, the coated article can include a substrate material as generally disclosed herein, one or more intermediate coatings on the substrate (e.g., an epoxy coating, an acrylic coating, another primer coating, etc.), and the crosslinked adhesive composition on the one or more intermediate coatings as the final, external coating on the coated article.

The cured or crosslinked adhesive composition can have any desired thickness on the substrate(s). In common applications, the crosslinked adhesive composition has a thickness ranging from 0.010 μm to 500 μm, for example at least 0.01, 10, 20, 50, or 100 μm and/or up to 200, 500 μm. Typical cast coatings can have thicknesses of 10 μm to 100 μm. Typical spin coatings can have thicknesses of 0.05 μm or 0.10 μm to 0.20 μm or 0.50 μm. Multiple coating layers can be applied to substrate to form even thicker layers of the adhesive composition (e.g., above 500 μm or otherwise) if desired.

EXAMPLES

The following examples illustrate the disclosed compositions and methods, but are not intended to limit the scope of any claims thereto.

Example 1

In the following example, a lignin-glyoxal resin and corresponding adhesive formulation were formed according to the disclosure. A comparative phenol-resorcinol-formaldehyde resin and corresponding adhesive formulation was also formed.

Lignin-Glyoxal Resin: An initial attempt was made to form a resin using the method and procedures of Kalami 2018, but with lignin and glyoxal used in place of lignin and formaldehyde. This process with simple replacement of formaldehyde with glyoxal resulted in gelation of the resin (i.e., the aqueous reaction mixture's viscosity reached increased substantially and approached infinity). A modified approach according to the disclosure was used to control the initial condensation reaction in order to prevent or reduce gelation while forming a non-crosslinked resin reaction product. Specifically, the net amount of added base catalyst (NaOH) was increased while keeping the concentration of base catalyst in the aqueous reaction mixture constant/below a level that would induce gelation. For example, rather than using 25 mL of 1N base for every 5 g of lignin, the amount was increased by adding an additional 10 mL of base solution over time.

Lignin-Glyoxal Adhesive Formulation: An attempt was also made to form a corresponding adhesive or glue mix formulation using the lignin-glyoxal reaction product and the method and procedures of Kalami 2018. This process resulted in a non-homogenous mixture, which made it difficult to determine the viscosity, lap shear strength, solid content and other properties of the formulated adhesive. Accordingly, the adhesive formulation was modified by reducing the amount of fillers and increasing water to reduce the viscosity as shown in Table 2 below.

TABLE 2

| Adhesive Formulation Composition | | |
| --- | --- | --- |
| Component | Amount (wt. %) Kalami 2018 | Amount (wt. %) Modified |
| Sodium Hydroxide | 3 | 3 |
| Alder Bark (Modal) | 6.5 | 5.5 |
| Wheat flour | 6.5 | 5.5 |
| Water | 18 | 20 |
| Formulated Lignin-Glyoxal Resin | 66 | 66 |

The modified adhesive formulation shown in Table 2 along with an increased mixing time from 5 minutes was sufficient to achieve a homogeneous adhesive formulation and permitted measurement of the adhesive properties. Table 3 below provides physical and chemical properties of an adhesive according to the disclosure (i.e., a lignin-glyoxal adhesive) as well as a comparative adhesive (i.e., a phenol-resorcinol-formaldehyde adhesive).

TABLE 3

| | | Adhesive Formulation Properties | | |
| Sample ID | pH | Solid Content, wt. % | Viscosity, mPa*s | Dry Lap Shear Strength, MPa |
| --- | --- | --- | --- | --- |
| Lignin Glyoxal | 12.7 | 28 (0.1) | 320 | 3.4 (0.6) |
| Phenol Resorcinol Formaldehyde | 13.2 | 37 (0.1) | 600 | 3.6 (0.5) |

Example 2

In the following example, a bio-based analog of a phenol-formaldehyde adhesive was prepared. Both phenol and formaldehyde were entirely replaced with a biorefinery corn stover lignin (L) and glyoxal (G), respectively. A lignin-glyoxal (LG) resole resin was synthesized using an alkaline catalyst with a molar ratio of lignin to glyoxal 1:2. Chemical, physical and mechanical characterization of the lignin and the lignin-based adhesive were performed. The prepared LG adhesive had suitable mechanical strength properties that are comparable to those of commercial adhesives, which makes the LG adhesive suitable for wood engineering product applications.

Materials: Corn stover lignin cake, as a byproduct of bioethanol synthesis via dilute acid pretreatment and enzymatic hydrolysis, was prepared from POET LLC and isolated for further use. For this purpose, 100 g of lignin cake was dissolved in 1000 ml sodium hydroxide (0.5 M) for 30 minutes at 350 rpm. Then, the solid part was separated by centrifugation at 4150 rpm for 5 minutes and discharged. The pH of the supernatant was adjusted on 2 by drop-by-drop addition of sulfuric acid (1 molar). Then the solution was heated up to 80° C. and maintained at this temperature for 30 minutes. The solution was then vacuum-filtered and washed first with 500 ml distilled water at 60° C. and then washed with 500 ml room temperature water. The solid part was dried in a vacuum oven for 24 hours at 50° C. Glyoxal (40%), formaldehyde (37%), and all other reagents were purchased from Acros Organics or Fisher Scientific Inc.

Lignin Characterization: The ash content percent of lignin was determined using TAPPI-T 211 om-93 test method. First ceramic crucibles were dried at 105° C. using an oven and weighed to the nearest 0.1 mg after cooling in a desiccator. Then 2 g of lignin, dried in an oven at 105° C. for 1 hr and cooled in a desiccator, was added to each crucible (3 replicates). Samples were placed in a THERMOLYNE FURNATROL muffle furnace and heated up to 525° C. with a heating rate of 5° C./minute. After 4 hours, samples were cooled down to 100° C. and then moved to a desiccator. After reaching the room temperature, samples were weighed, and the ash content percent was calculated on a mass basis.

Gel permeation chromatography (GPC) was used to measure the number average molecular weight ($M_n$), weight average molecular weight ($M_w$), and polydispersity index (PDI) of the lignin. First, the acetylation of lignin was carried out to improve the solubility of lignin in tetrahydrofuran (THF), which was used as the mobile phase. For the acetylation, 1 g lignin was added to a 40 ml solution of pyridine and acetic anhydride (50-50 v/v %) and mixed at room temperature for 24 hours (600 rpm). Then, 150 ml of hydrochloric acid (M=0.1 molar) was used to precipitate acetylated lignin particles. Then using a vacuum filter, precipitated particles were separated and washed three times with low concentration hydrochloric acid solution (0.05 Molar) and deionized water. After this step, the acetylated lignin sample was dried for 16 hours using a vacuum oven at a temperature of 40° C. Next, the acetylated lignin was dissolved in HPLC grade THF at a concentration of 5 mg/ml, and using a syringe filter (PTFE, 0.45 μm) was filtered; the filtrate samples were used for GPC analysis. A Waters GPC system (E2695 SEPARATION MODULE) was then used to analyze the filtrate at a flow rate of 1 ml/min, using three 300 mm×7.8 mm columns in series, including (1) STYRAGEL HR 4 THF (5 k-600 k Å), (2) STYRAGEL HR 3 THF (500-30 k Å), and (3) ULTRASTYRAGEL THF (500 Å) (100-10 k Å). Polystyrene standards of specific molecular weights (162, 370, 580, 945, 1440, 1920, 3090, 4730, 6320, 9590, 10400, 16200 Da) were used as calibration standards. The filtrate solution (25 μL) was injected into the instrument and was detected using a refractive index detector (WATERS 2414), which was constantly maintained at the same temperature as the columns (35° C.) during the analysis. Data were collected and analyzed using EMPOWER GPC software.

A $^{31}$P NMR method was used for the quantitative determination of the phenolic hydroxyl content. For this purpose, a mixture of 325 μL of anhydrous pyridine/deuterated chloroform (1.6:1, v/v) and 300 μL anhydrous dimethylformamide (DMF) was prepared, and 40 mg of oven-dried lignin was then dissolved in the prepared solution under stirring. Then 100 μL of cyclohexanol with a concentration of 22 mg/mL (in anhydrous pyridine and deuterated chloroform with a ratio of 1.6:1.0 (v/v)) was added to the mixture. Then 50 μL of chromium (III) acetylacetonate solution with a concentration of 5.6 mg/mL in the mixture of anhydrous pyridine and deuterated chloroform (1.6:1.0, v/v) was added. The cyclohexanol acts as an internal standard, and chromium (III) acetylacetonate as relaxation reagent. At the end, for tagging hydroxyl groups during $^{31}$P NMR analysis, 100 μL of phosphitylating reagent (2-chloro-4,4,5,5-tetramethyl-1,3,2-dioxaphospholane (TMDP)) was added to the mixture. The sample was run in an AGILENT DDR2 500 MHz NMR spectrometer, equipped with 7600AS, running VnmrJ 3.2A, with a pulse delay of 5 s (relaxation time), and 128 scans. The evaluation of various hydroxyl groups content was based on the ratio of internal standard peak area to integrated areas attributed to various hydroxyl groups.

Table 4 below summarizes the physical and chemical properties of the corn stover lignin used in this example. Numbers in parentheses indicate standard deviation values based on 3 sample replicates.

TABLE 4

| Lignin Properties | |
| --- | --- |
| Lignin Property | Value |
| % Ash content (wt. %) | 0.57(0.001) |
| Mn (Da) | 1700(22.7) |
| Mw (Da) | 3700(25) |
| PDI (—) | 2.2(0.04) |
| Aliphatic hydroxyl content (mmol/g lignin) | 1.78(0.05) |
| Syringyl hydroxyl content (mmol/g lignin) | 0.47(0.02) |
| Guaiacyl hydroxyl content (mmol/g lignin) | 0.67(0.03) |
| Condensed phenolic hydroxyl content (mmol/g lignin) | 0.12(0.01) |

TABLE 4-continued

| Lignin Properties | |
| --- | --- |
| Lignin Property | Value |
| Hydroxyphenyl hydroxyl content (mmol/g lignin) | 0.71(0) |
| Carboxylic acid hydroxyl content (mmol/g lignin) | 0.66(0.02) |
| Total phenolic hydroxyl content (mmol/g lignin) | 1.97(0.04) |
| Total hydroxyl content (mmol/g lignin) | 4.41(0.05) |

Resin Preparation: In this example, phenol was replaced entirely with unmodified corn stover lignin, and the lignin-based resin was formulated using different molar ratios of formaldehyde and glyoxal (0, 20, 40, 60, 80, and 100 molar % of glyoxal). Using the same procedure conducted by Kalami 2018, the molar ratio of lignin to formaldehyde/glyoxal combination was kept constant at 1:2 for all the samples. First, 15 g of lignin was dissolved in 50 ml of sodium hydroxide (NaOH, 1N) solution in a beaker and transferred to a 250 ml three-necked round bottom flask equipped with a thermometer, stir bar, and condenser. For maintaining the temperature around the flask uniform, a dry bath stacker was used. Then the corresponding formaldehyde/glyoxal mixture was gradually added to the lignin solution. The temperature increased steadily from room temperature to 65° C. in 30 minutes while stirring at 500 rpm, using a digital hot-plate stirrer. Once the solution temperature reached 65° C. and kept constant for 30 minutes, then 25 ml of the NaOH solution (1N) was added to the mixture. At this time, the temperature increased gradually to 90° C., where it remained constant for 2 hours. Then the formulated resin was cooled to room temperature. Some of the resin was stored in the freezer to prevent further polymerization for adhesive preparation. The remaining resin was used to measure its chemical and physical properties.

A modified resin preparation procedure was also performed. Relative to the above procedure, in the modified procedure, after reaching the temperature to 65° C., the reaction mixture was kept constant at this temperature for 10 minutes (instead of 30 minutes) prior to the second addition of NaOH. At the last step of the modified procedure, the reaction proceeded for 60 minutes at 90° C. (instead of 2 hours).

Adhesive Preparation: The various resins were used to formulate an adhesive using the same procedure recommended for commercial phenol-formaldehyde glue mix preparation by industry, which was reported by Kalami 2018. First, 6.5% (all on the weight basis) wheat flour was dissolved in 18% of distilled water. Then 6.5% plywood extender (Modal) was added slowly to the wheat flour mixture while stirring with a glass rod. Next, a combination of 3% NaOH and 66% thawed resin was added to the pellet and stirred for 5 minutes using a high-speed mixer at 800 rpm until the mixture became homogenous. A modified adhesive formulation was also prepared to increase the alkalinity of the adhesive, in particular by increasing the NaOH content and reducing the filler content. Table 5 below shows the amounts of different components for the original and modified adhesive formulations for this example.

TABLE 5

| Adhesive Formulation Composition | | |
| --- | --- | --- |
| Component | Amount (wt. %) Kalami 2018 | Amount (wt. %) Modified |
| Sodium Hydroxide | 3 | 4 |
| Alder Bark (Modal) | 6.5 | 6 |
| Wheat flour | 6.5 | 6 |
| Water | 18 | 18 |
| Formulated Lignin-Glyoxal Resin | 66 | 66 |

Resin and Adhesive Characterization: The solid (or non-volatile) content of a resin sample was measured with five replicates for each sample, according to ASTM D4426-01. Accordingly, aluminum pans were placed in a furnace at 270° C. for about 1 min to burn off any excess oils left behind during manufacturing. The pans were cooled to room temperature and weighed. Then 1 g of the resin was measured in each labeled pan and placed in an oven for 105 mins at 125° C. In the next step, using a desiccator, samples were cooled to room temperature and then weighed. The solid content was determined based on mass difference and expressed on a wt. % basis.

The pH of resin and adhesive samples was measured using a Mettler Toledo S220 digital pH meter at room temperature after stirring the samples for 10 s at 400 rpm.

The viscosity of the formulated resin and adhesive samples was measured using a DISCOVERY HR-1 hybrid rheometer (TA Instruments) at a constant temperature of 23° C. and a shear rate of 1000 s$^{-1}$.

The gelation time of a resin sample was measured using the manufacturer's recommended procedure. Briefly, the DISCOVERY HR-1 hybrid rheometer (TA Instruments) with 40 mm parallel plates was used at constant temperature of 25° C. A dynamic time sweep method was selected and an oscillation-time mode was set. After running the instrument with an appropriate amount of resin, the crossover of storage and loss modulus curves provides the gelation point.

The free formaldehyde content of a resin sample was measured using the hydroxylamine hydrochloride method. When formaldehyde reacts with hydroxylamine hydrochloride, hydrochloric acid is formed, and a potentiometric titration is used to determine the amount of produced hydrochloric acid. For determining free formaldehyde content, 5 g of resin was weighed and added to 100 ml distilled water. Then, using 0.1 N HCl, the pH was adjusted to 4.0 while stirring the solution at 350 rpm. Then 20 ml of 10 wt. % hydroxylamine hydrochloride was added to the resin solution. After 5 minutes, the solution was titrated to a pH of 4.0 using 0.1N NaOH. The free formaldehyde content was then calculated as [Vml (NaOH)×N(NaOH)×3.003]/ [weight of resin sample (g)].

Alkalinity is different from pH in the sense that alkalinity shows the ability of a solution to neutralize acids and depends on the total number of anions present in the solution, while the pH value reflects the acidic or basic strength of the solution. In either case, extreme pH or alkalinity values can adversely affect the mechanical performance of an adhesive, especially in the presence of moisture. The alkalinity of a sample was measured according to the procedure recommended by Lorenz and Christiansen. Different amounts of resin or adhesive (2 to 10 g), based on the expected amount of NaOH in the resin or adhesive, were added to 100 ml distilled water. Then 0.1N Hydrochloric acid solution was used to titrate the solution to a pH of 3.5. The alkalinity measurement is based on the volume of hydrochloric acid and the amount of resin or adhesive being used, and it is expressed a % NaOH value: [Vml HCl used×0.4×100]/[weight of resin or adhesive sample (g)].

Lap shear strength was evaluated to measure the adhesion strength of the produced adhesives under similar conditions as used by industry for manufacturing plywood. According to ASTM D5868-01, 0.10-0.12 g of the prepared adhesive was applied on one-fourth of a veneer sample surface (contact area: 25.4 mm×25.4 mm; veneer sizes: 25.4 mm×101.6 mm×5.6 mm), prepared using yellow southern pine wood. Ten replicates of each formulated adhesive were tested for shear strength testing. Using a hot press, two veneers were pressed at 175° C. under 1250 kPa for 4 min. An Instron 5565 universal testing machine with a loading rate of 0.5 in/min was used to measure the adhesion strength of the adhesive samples.

The wood failure percentage for the tested lap shear samples was determined quantitatively using image analysis software according to the procedure reported by Kalami 2018. This analysis was conducted to determine what percentage of the veneer samples failed due to adhesive failure or wood failure. A higher value for the wood failure percentage indicates that the wood was the limiting strength component (i.e., first to fail under stress), which reflects a stronger adhesive bond.

Resin Properties: Various properties of formulated resins, including pH, alkalinity (%), free aldehyde content (%), gelation time, viscosity, and solid content were measured, and results are listed in Table 6. In the Table 6 Sample ID, "L" indicates lignin, "F" indicates formaldehyde, "G" indicates glyoxal, a number indicates the percent of formaldehyde replaced by glyoxal, and "modified" indicates that the modified resin formation procedure described above was used. Numbers in parentheses indicate measurement standard deviation based on at least 3 sample replicates. Almost all the tested properties are comparable to the properties of commercial PF resins. As the glyoxal replacement rises, the free aldehyde content shows an increasing trend. This is because during free aldehyde content determination, the weight percentage of free aldehyde in the resin is measured by the titration and since the glyoxal possesses a higher molecular weight in comparison with formaldehyde this amount increases.

TABLE 6

| | | | Gelation | | Free | |
| Sample ID | pH | Alkalinity (%) | time (min) | Viscosity (mPa · s) | Formaldehyde Content (%) | Solid Content (%) |
|---|---|---|---|---|---|---|
| LF-0 | 11.39 (0.01) | 2.85 (0) | 40.67 (1.25) | 6.54 | 0.19 (0) | 18.74 (0) |
| LFG-20 | 10.49 (0) | 2.72 (0) | 34.10 (1.13) | 10.98 | 0.26 (0) | 19.85 (0) |
| LFG-40 | 10.12 (0) | 2.69 (0) | 27.11 (1.73) | 28.21 | 0.27 (0) | 20.14 (0) |
| LFG-60 | 9.83 (0) | 2.63 (0) | 26.8 (1.78) | 28.57 | 0.29 (0) | 20.28 (0) |
| LFG-80 | 8.25 (0) | 2.48 (0) | 4.94 (0.30) | 30.38 | 0.34 (0) | 20.57 (0) |
| LG-100 | 8.21 (0) | 2.46 (0) | 4.89 (0.29) | 35.33 | 0.36 (0) | 21.07 (0) |
| Modified LG-A100 | 7.36 (0) | 1.64 (0) | 5.33 (0.72) | 28.22 | 0.52 (0) | 19.91 (0) |

Adhesive Properties: Physical, chemical, and mechanical properties of lignin-based adhesives were measured, and the results are provided in Tables 7 and 8. The abbreviations in the Sample ID are the same as for Table 6, except that "A" indicates an adhesive formulation according to Kalami 2018 in Table 5 above, "modified" indicates the modified adhesive formulation in Table 5 above, and "PF-A" indicates a comparative phenol-formaldehyde adhesive. Mechanical performance of the formulated lignin-based adhesives was examined by measuring lap shear strength as well as by analyzing the wood failure percentage. Previous investigations with only 50% (or less) replacement of phenol with lignin have reported comparable mechanical strength to commercial adhesives, but more than 50% replacement of phenol with lignin reduced mechanical properties to a great extent. In this example, however, the prepared lap shear joint samples using a lignin-glyoxal adhesive provided a mechanical strength that is comparable to shear strength values for commercial adhesives.

TABLE 7

| Adhesive Physical and Chemical Properties | | | | |
|---|---|---|---|---|
| Sample ID | pH | Viscosity (mPa · s) | Free Aldehyde Content (%) | Solid Content (%) |
| LF-A0 | 13.96 (0) | 173 | 0.11 (0) | 28.8 (0) |
| LFG-A20 | 13.90 (0.01) | 212 | 0.12 (0.01) | 29.7 (0.15) |
| LFG-A40 | 13.83 (0.02) | 230 | 0.14 (0.01) | 30.6 (0.48) |
| LFG-A60 | 13.72 (0.02) | 294 | 0.17 (0.02) | 31.3 (0.37) |
| LFG-A80 | 13.68 (0.03) | 374 | 0.20 (0.01) | 32.9 (0.37) |
| LG-A100 | 13.64 (0) | 394 | 0.22 (0) | 33.6 (0.01) |
| Modified LG-A100 | 13.62 (0.02) | 320 | 0.42 (0) | 28.22 (0) |

TABLE 8

| Adhesive Mechanical Properties | | | |
|---|---|---|---|
| Sample ID | Applied Adhesive (g) | Lap Shear Strength (MPa) | Wood failure (%) |
| LF-A0 | 0.12 | 3.37 (0.45) | 66 (23) |
| LFG-A20 | 0.12 | 3.75 (0.13) | 64 (16) |
| LFG-A40 | 0.12 | 3.01 (0.43) | 73 (13) |
| LFG-A60 | 0.12 | 2.89 (0.42) | 62 (13) |
| LFG-A80 | 0.12 | 2.78 (0.55) | 64 (16) |
| LG-A100 | 0.12 | 2.55 (0.40) | 57 (18) |
| Modified LG-A100 | 0.12 | 3.36 (0.59) | 55 (18) |
| Lab PF- A | 0.12 | 3.4 (0.2) | 88 (8) |

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

What is claimed is:

1. A method for forming an adhesive composition, the method comprising:

providing an aqueous reaction mixture comprising
  water,
  a lignin comprising aromatic hydroxyl groups and ortho-reactive carbon atoms relative to the hydroxyl groups,
  a base catalyst to solubilize the lignin in the aqueous reaction mixture, and
  an aldehyde having at least 2 carbon atoms and having at least 2 aldehyde functional groups (—CHO), wherein: (i) the aldehyde is added to the aqueous reaction mixture in a controlled manner and in the presence of the base catalyst solubilizing the lignin, thereby beginning a condensation reaction between the lignin and the aldehyde, (ii) adding the aldehyde in the controlled manner to comprises adding the aldehyde batchwise in 2 or more batch additions or continuously over time, while maintaining the aldehyde concentration in the aqueous reaction mixture below a level that would induce gelation, and (iii) a molar ratio of lignin aromatic hydroxyl groups to aldehyde functional groups in the aqueous reaction mixture is in a range of 1:1.1 to 1:4;

adding further base catalyst in a controlled manner to the aqueous reaction mixture, thereby catalyzing the condensation reaction between the lignin and the aldehyde while maintaining a viscosity of the aqueous reaction mixture below a gelation point of the aqueous reaction mixture, wherein:
  (i) a molar ratio of total aromatic hydroxyl groups originally present in the lignin to total aldehyde functional groups added to the aqueous reaction mixture is less than 1 during the condensation reaction, and
  (ii) adding the further base catalyst in the controlled manner to the aqueous reaction mixture comprises adding the further base catalyst batchwise in 2 or more batch additions or continuously over time to the reaction mixture, while maintaining the base catalyst concentration in the reaction mixture below a level that would induce gelation;

continuing the condensation reaction between the lignin and the aldehyde to form a resin reaction product while maintaining the viscosity of aqueous reaction mixture below the gelation point of the aqueous reaction mixture until a completion point is reached, wherein, at the completion point, at least some unreacted ortho-reactive carbon atoms remain, at least some substituted methylol functional groups have been formed by the condensation reaction, and the resin reaction product is not crosslinked and has a gelation time measured at 25° C. in a range of 2 minutes to 6 minutes.

2. The method of claim 1, comprising forming the resin reaction product at a reaction temperature in a range from 40° C. to 95° C. while avoiding gelation and crosslinking.

3. The method of claim 1, wherein the lignin is derived from a biomass selected from the group consisting of hardwoods, softwoods, grasses, and combinations thereof.

4. The method of claim 1, wherein the lignin is isolated from an extraction process selected from the group consisting of Kraft extraction, soda extraction, organosolv extraction, enzymatic hydrolysis extraction, ionic liquid, extraction, sulfite extraction, and combinations thereof.

5. The method of claim 1, wherein the lignin has at least one of the following properties:
  a weight-average molecular weight of 2000 or less;
  a polydispersity of 2.0 or less; and
  at least 60% of the aromatic hydroxy groups have at least 1 ortho-reactive carbon relative to the hydroxy group.

6. The method of claim 1, wherein at least 60% of the aromatic hydroxy groups in the lignin have at least 1 ortho-reactive carbon relative to the hydroxy group.

7. The method of claim 1, wherein the aldehyde has 2 to 50 carbon atoms and has 2 to 4 aldehyde functional groups.

8. The method of claim 1, wherein the aldehyde comprises glyoxal.

9. The method of claim 1, wherein the aqueous reaction mixture is free from phenol and formaldehyde.

10. The method of claim 1, wherein the aqueous reaction mixture comprises formaldehyde.

11. The method of claim 10, wherein:
  5% to 50% of the aldehyde functional groups in the aqueous reaction mixture are from the formaldehyde; and
  50% to 95% of the aldehyde functional groups in the aqueous reaction mixture are from the aldehyde having at least 2 carbon atoms and having at least 2 aldehyde functional groups.

12. The method of claim 11, wherein the resin reaction product has an alkalinity value in a range of 2% to 3%.

13. The method of claim 11, wherein the resin reaction product has a gelation time measured at 25° C. in a range of 4 minutes to 6 minutes.

14. The method of claim 10, wherein:
  20% to 60% of the aldehyde functional groups in the aqueous reaction mixture are from the formaldehyde; and
  40% to 80% of the aldehyde functional groups in the aqueous reaction mixture are from the aldehyde having at least 2 carbon atoms and having at least 2 aldehyde functional groups.

15. The method of claim 10,
  20% to 40% of the aldehyde functional groups in the aqueous reaction mixture are from the formaldehyde; and
  60% to 80% of the aldehyde functional groups in the aqueous reaction mixture are from the aldehyde having at least 2 carbon atoms and having at least 2 aldehyde functional groups.

16. The method of claim 15, wherein the resin reaction product has a pH value in a range of 10 to 11.

17. The method of claim 1, further comprising:
  adding one or more adhesive components to the aqueous reaction mixture at or after the completion point, the adhesive components being selected from the group consisting of fillers, further catalyst, and further water; and
  continuing the condensation reaction between remaining unreacted ortho-reactive carbon atoms and the substituted methylol groups in the resin reaction product, thereby forming a crosslinked adhesive composition.

18. The method of claim 17, comprising continuing the condensation reaction at a reaction temperature in a range from 100° C. to 200° C. while crosslinking.

19. The method of claim 17, comprising continuing the condensation reaction when the aqueous reaction mixture is in contact with one or more substrates.

20. The method of claim 1, wherein a molar ratio of lignin aromatic hydroxyl groups to aldehyde functional groups in the aqueous reaction mixture is in a range of 1:1.5 to 1:3.

21. The method of claim 1, comprising:

adding the further base catalyst batchwise in 2 or more batch additions; and adding the aldehyde batchwise in 2 or more batch additions.

22. The method of claim 21, wherein:

the method comprises forming the resin reaction product at a reaction temperature in a range from 40° C. to 95° C. while avoiding gelation and crosslinking;

the aldehyde has 2 to 50 carbon atoms and has 2 to 4 aldehyde functional groups; and the method further comprises:

adding one or more adhesive components to the aqueous reaction mixture at or after the completion point, the adhesive components being selected from the group consisting of fillers, further catalyst, and further water; and continuing the condensation reaction between remaining unreacted ortho-reactive carbon atoms and the substituted methylol groups in the resin reaction product at a reaction temperature in a range from 100° C. to 200° C., thereby forming a crosslinked adhesive composition.

23. The method of claim 1, wherein the resin reaction product has a viscosity measured at 23° C. and at a shear rate of 1000 s$^{-1}$ in a range of 10 mPa·s to 40 mPa·s.

24. The method of claim 23, wherein the resin reaction product has a pH value in a range of 7 to 9.

\* \* \* \* \*